US006666734B2

(12) United States Patent
Fukatsu

(10) Patent No.: US 6,666,734 B2
(45) Date of Patent: Dec. 23, 2003

(54) METHOD FOR PRODUCING A MALE TERMINAL FITTING WITH A TAB FREE OF SHARP EDGES

(75) Inventor: Yukihiro Fukatsu, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/243,575

(22) Filed: Sep. 13, 2002

(65) Prior Publication Data

US 2003/0060091 A1 Mar. 27, 2003

(30) Foreign Application Priority Data

Sep. 27, 2001 (JP) ....................................... 2001-297713

(51) Int. Cl.[7] .......................... H01R 9/24; H01R 13/02; B21D 41/00; B23D 23/00

(52) U.S. Cl. ...................... 439/884; 29/33 M; 72/370.1

(58) Field of Search ................................ 439/884, 866, 439/862, 877, 849, 850; 29/509, 33 M, 874, 751; 72/370.1, 370.13, 370.2, 352

(56) References Cited

U.S. PATENT DOCUMENTS 3,638,597 A * 2/1972 Brown ........................ 29/509
4,513,499 A * 4/1985 Roldan ........................ 29/874
5,575,062 A * 11/1996 Nakajima et al. ............. 29/874
5,823,834 A * 10/1998 Straeb et al. ............... 439/884
5,989,080 A * 11/1999 Tsuji et al. ................. 439/884
6,375,472 B1 * 4/2002 Zeiger et al. ................. 439/61
2002/0146944 A1 * 10/2002 Akiyama .................... 439/862

FOREIGN PATENT DOCUMENTS

JP 3-291872 12/1991

* cited by examiner

*Primary Examiner*—Chandrika Prasad
(74) *Attorney, Agent, or Firm*—Gerald E. Hespos; Anthony J. Casella

(57) ABSTRACT

A male terminal fitting has a tab (12) with a long narrow base (15) and a tip (16) at a leading end of the base (15). The tip (16) is arcuate in plan view and hence is narrowed toward its end. A mold (30) is provided with a pressing recess (31) and a closed back wall (32). The mold (30) is brought closer to the tab (12) from the front, so that the leading end of the tab (30) is inserted into a pressing recess (31) and strikes the closed back wall (32). Thus, edges (23) on the tip (16) are smashed and rounded and will not damage wall surfaces of a cavity or a rubber plug.

6 Claims, 6 Drawing Sheets

METHOD FOR PRODUCING A MALE TERMINAL FITTING WITH A TAB FREE OF SHARP EDGES

BACKGROUND OF THE INVENTION

1. Field of the Invention

The invention relates to a method for producing a male terminal fitting that has a tab.

2. Description of the Related Art

A known tab for a male terminal fitting is shown in Japanese Patent Publication No. 3-291872 and is identified by the numeral 1 in FIG. 8 herein. The tab 1 has a planar base 2 and a tapered tip 3 at the leading end of the base 2 to facilitate insertion into a cavity of a connector, a mating female terminal fitting or the like.

The tab 1 is formed from a metallic plate that is stamped by a press into an elongated blank or development, as shown in FIG. 9. The development is divided into three sections along the widthwise direction to define a center section 1A and left and right sections 1B. The leading ends of the sections 1A, 1B define trapezoidal cut surfaces 4A, 4B that taper toward their ends.

The tab 1 is formed by folding the left and right sections 1B along longitudinal fold lines and onto the upper surface of the center section 1A. Hence the tab 1 has a thickness that is twice the thickness of the metallic plate. At this time, the cut surfaces 4A, 4B of the center section 1A and the left and right sections 1B are aligned to form the tapered trapezoidal tip 3.

The tip 3 is pressed from above and below to form slanted surfaces 5 on its upper and lower surfaces and to become tapered also in side view.

The tip 3 of the tab 1 is stamped out of the metallic plate by the press, as described above. Thus, sharp edges 6 are formed around the cut surfaces 4A, 4B. As a result, the edges 6 may damage the wall surfaces of a cavity of a connector during insertion of the male terminal fitting into the cavity. The edges 6 may damage a waterproof rubber plug as the tip 3 is introduced through a hole of the rubber plug.

The invention was developed in view of the above problem and an object thereof is to provide a method for producing a male terminal fitting and a male terminal fitting having an improved operability.

SUMMARY OF THE INVENTION

The invention relates to a method for forming a tab of a terminal fitting so that edges at the tip of the tab are rounded or smoothed. Thus, the edges will not damage wall surfaces of a cavity in a connector during insertion of the terminal fitting into the cavity. Similarly, the edges will not damage a rubber plug as the male terminal fitting is introduced into a through hole of the plug.

The terminal fitting is a male terminal fitting that has a tab with a long narrow base and a tapered tip at the leading end of the base. The method comprises longitudinally folding substantially flat sections continuously provided along a widthwise direction of a metallic plate. The method then comprises providing a mold with a pressing recess that has a closed back end. The method further includes bringing the mold closer to the tab from the front of the tab and inserting the leading end of the tab into the pressing recess and striking the tip with back wall at the closed back of the pressing recess. Thus, edges of the tip are smashed or deformed and rounded.

Accordingly, the edges will not are damage wall surfaces of a cavity of a connector during insertion of the male terminal fitting into the cavity. Similarly, the edges will not damage a rubber plug as the male terminal fitting is introduced into a through hole of the plug.

Leading ends of the substantially flat sections preferably are cut to be arcuate and narrowed in plan view The method then may comprise substantially aligning the cut surfaces at the leading ends of the substantially flat sections. Accordingly, the edges are reduced and rounded better as compared to the trapezoidal tip of the prior art.

Preferably, the tip and at least part of the base of the tab are inserted closely into the pressing recess when the mold is struck against the tab. In particular, the mold is brought closer to the tab along the longitudinal direction of the tab. Thus, the inner circumferential walls of the pressing recess support the leading end of the tab. Accordingly, the pressing forces of the mold will not cause the tab to undergo a bending deformation.

Most preferably, the flat sections are formed to have slanted surfaces that are slanted in thickness direction of the metal plate.

The invention also is directed to a male terminal fitting that has a tab with a long narrow base and a tapered tip at the leading end of the base. The tab is formed by longitudinally folding substantially flat sections of a metallic plate continuously along a widthwise direction. The tip is arcuate in plan view, and hence narrows toward the leading end. Accordingly, the edges are reduced and rounded better as compared to the prior art trapezoidal tip.

The tip preferably is formed by pressing. Additionally, the arcuate cut surfaces at the leading ends of the respective flat sections preferably are substantially aligned.

Most preferably, the flat sections have slanted surfaces that are slanted in thickness direction of the metal plate.

These and other objects, features and advantages of the invention will become more apparent upon reading the following detailed description and accompanying drawings. Even though embodiments are described separately, single features thereof may be combined to additional embodiments.

DETAILED DESCRIPTION OF THE PREFERRED EMBODIMENTS

Figure 1:
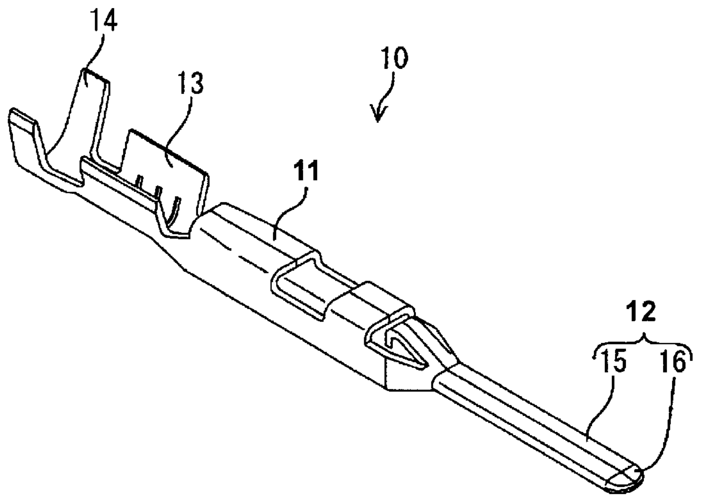
FIG. 1 is a perspective view of a male terminal fitting according to the invention.

A male terminal fitting according to the invention is identified by the numeral 10 in FIG. 1. The male terminal fitting 10 is formed by stamping or cutting a single electrically conductive metallic plate into a blank or development and then successively bending and/or embossing the plate by a press. The male terminal fitting 10 is long and narrow along forward and backward directions, and has a box 11 at a central longitudinal position. A tab 12 is at a front end of the terminal fitting 10 and is connectable with an unillustrated female terminal fitting. Front and rear pairs of barrels 13, 14 are at the rear end of the terminal fitting 10 and the barrels 13, 14 in each pair extend respectively from left and right walls of the terminal fitting 10. The front barrels 13 are configured to be crimped, bent or folded into connection with a core of a wire and the rear barrels 14 are configured to be crimped, bent or folded into connection with an insulated portion of the wire.

Figure 2:
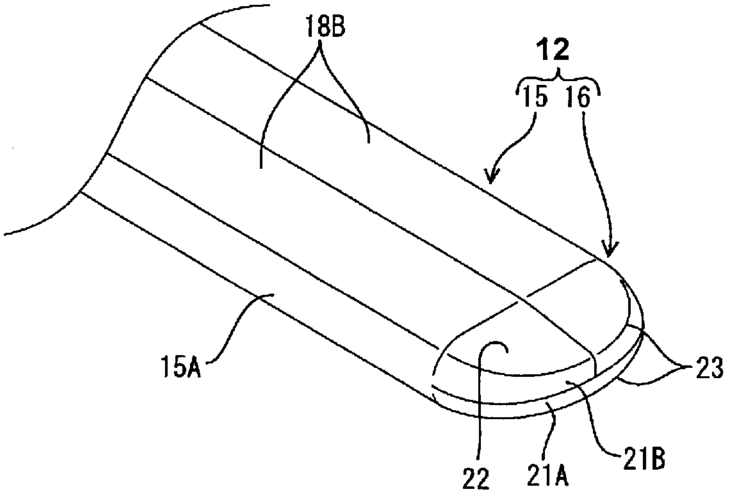
FIG. 2 is a fragmentary enlarged perspective view of a tab.

The tab 12 has a substantially flat base 15 that extends along forward and backward directions and defines a substantially constant width along its length. A tapered or rounded tip 16 is provided at the leading end of the base 15, as shown most clearly in FIG. 2.

Figure 3:
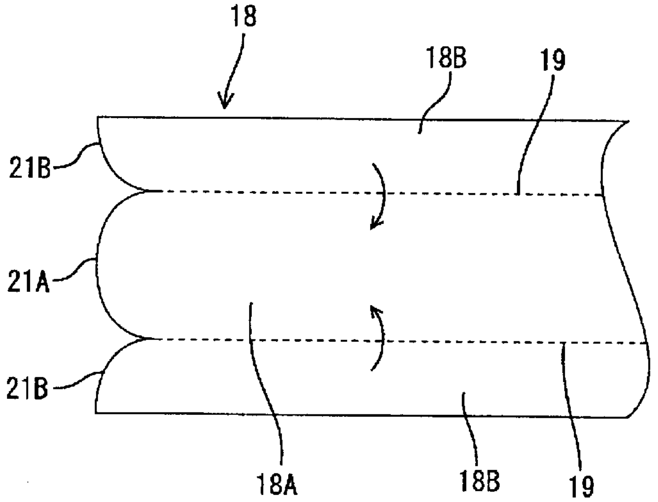
FIG. 3 is a plan view showing a development of the tab.

The terminal fitting 10 is formed from a metallic plate 18 that is stamped or cut by a press. A part of the plate 18 that becomes the tab 12 has a center section 18A and left and a right sections 18B that are continuous with one another along the widthwise direction, as shown in FIG. 3. The left and right sections 18B preferably are about half as wide as the center portion 18A. Boundaries between the center section 18A and the left and right sections 18B define fold lines 19 that extend longitudinally. An arcuate or converging cut surface 21A is formed at the leading end of the center portion 18A and is narrowed or tapered toward its end when viewed from above. Arcuate or converging cut surfaces 21B are formed at the leading ends of the left and right sections 18B and also are narrowed or tapered toward their ends. The cut surfaces 21B are substantially symmetrical with respect to the fold lines 19.

The left and right sections 18B are folded along the fold lines 19 and are placed on the upper surface of the center section 18A. Thus, the tab 12 is substantially twice as thick as the metallic plate. The bending of the left and right sections 18B along the fold lines 19 forms rounded side surfaces 15A along the base 15. The cut surface 21A of the center section 18A and the cut surfaces 21B of the left and right sections 18B substantially align at the tip 16. Consequently, the tip 16 has an arcuate or converging shape in plan view and is narrowed or tapered toward its end.

The tip 16 is pressed from above and below to form slanted surfaces 22 on its upper and lower surfaces and to become tapered in side view or in a sectional view along a direction normal to the plan view or along thickness direction. At this point in the forming process, sharp upper and lower edges 23 are defined around the slanted surfaces 22.

Figure 4:
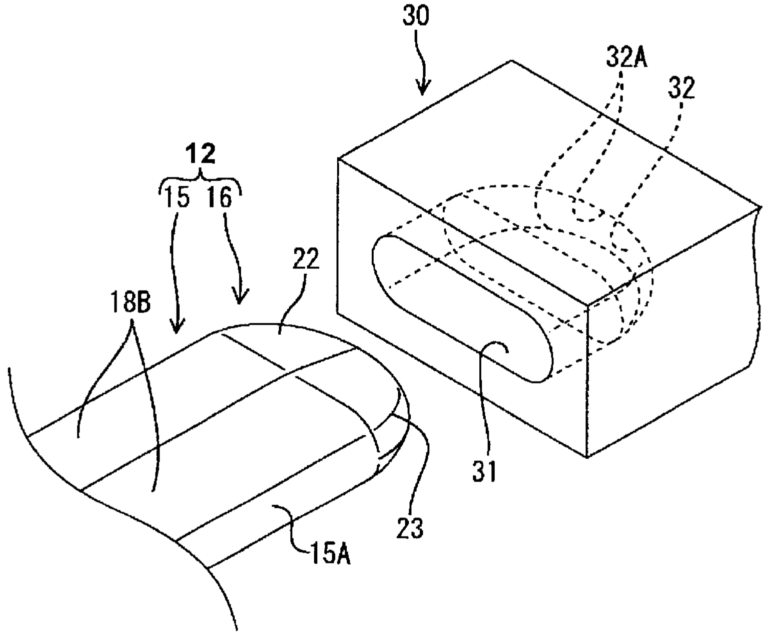
FIG. 4 is a perspective view showing the tab and a mold.
Figure 5A:
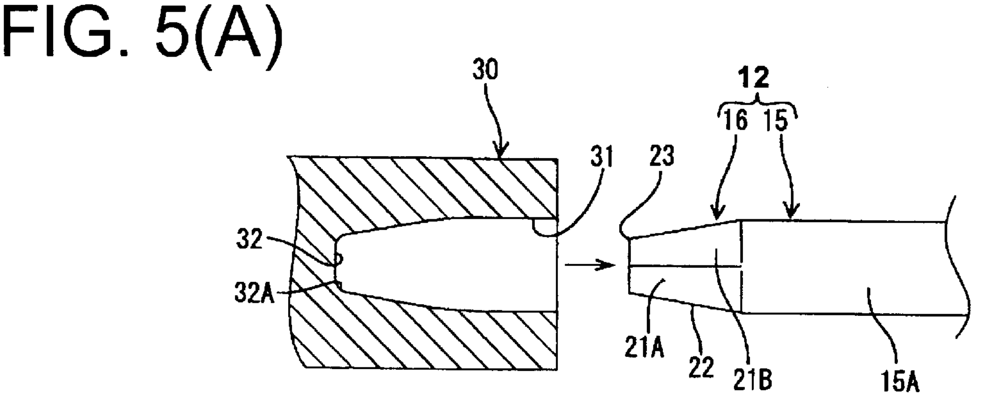
FIGS. 5(A), 5(B) and 5(C) are side views in section showing a state before the mold is struck against the tab, a state where the mold is struck against the tab, and a state where the tab is withdrawn from the mold.

The edges 23 of the tip 16 are rounded using a mold 30 shown in FIG. 4. The mold 30 has a pressing recess 31 with an open front and a closed back wall 32. The tip 16 of the tab 12 and parts of the base 15 adjacent the tip 16 are inserted closely into the pressing recess 31. The back wall 32 of the pressing recess 31 has rounded recessed surfaces 32A at portions corresponding to the edges 23 of the tip 16, as shown in FIG. 5(A).

Figure 5B:
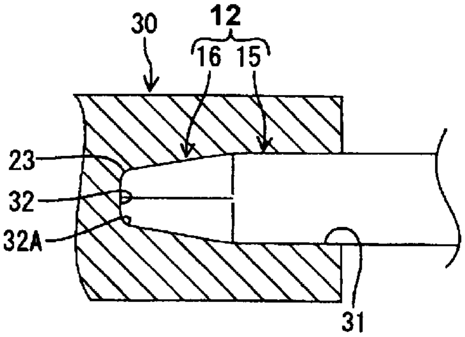

The pressing recess 31 of the mold 30 is positioned opposed to and aligned with the front of the tab 12, and is brought closer to the tab 12 substantially along its longitudinal direction. The tip 16 and adjacent parts of the base 15 of the tab 12 are inserted into the pressing recess 31 so that the tip 16 strikes against the base wall 32 (see FIG. 5(B)). Thus, the edges 23 of the tip 16 are smashed or deformed by the recessed surfaces 32A of the back wall 32, and are deformed into rounded shapes substantially along the recessed surfaces 32A. At this time, a pressing force from the mold 30 acts on the male terminal fitting 10. However, the pressing force acts along the longitudinal direction of the male terminal fitting 10, and therefore is unlikely to bend the male terminal fitting 10. Further, the tip 16 and adjacent parts of the base 15 are accommodated closely in the pressing recess 31. Consequently, the leading end of the tab 12 is supported by the inner surfaces of the pressing recess 31, and pressing forces from the mold 30 will not bend the tab 12.

Figure 5C:
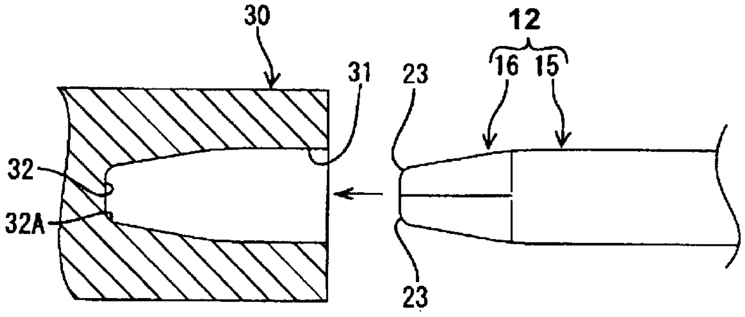

Finally, the mold 30 is moved back to withdraw the tab 12 from the pressing recess 31. As a result, the edges 23 of the tip 16 of the male terminal fitting 10 are smashed or deformed and rounded, as shown in FIG. 5(C).

As described above, the edges 23 are rounded by inserting the tab 12 into the pressing recess 31 and striking the tip 16 against the back wall 32. Thus, the edges 23 will not damage surfaces of a cavity of a connector as the male terminal fitting 10 is inserted into the cavity or from damaging a rubber plug as the male terminal fitting 10 is inserted in a through hole of the plug.

The tip 16 and adjacent parts of the base 15 are inserted closely into the pressing recess 31 when the mold 30 is struck against the tab 12 and the inner circumferential walls of the pressing recess 31 support the leading end of the tab 12. Thus, the tab 12 is prevented from undergoing a bending deformation caused by the pressing force from the mold 30.

The tip 16, in plan view, has an arcuate shape that is narrowed toward its end. Thus, the edges are reduced and are rounded better as compared to the trapezoidal tip of the prior art.

Figure 6:
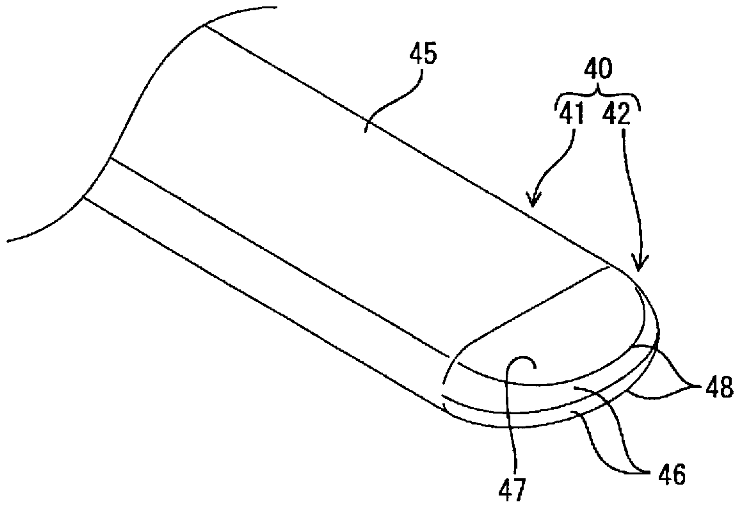
FIG. 6 is a fragmentary enlarged perspective view of an alternate tab.
Figure 7:
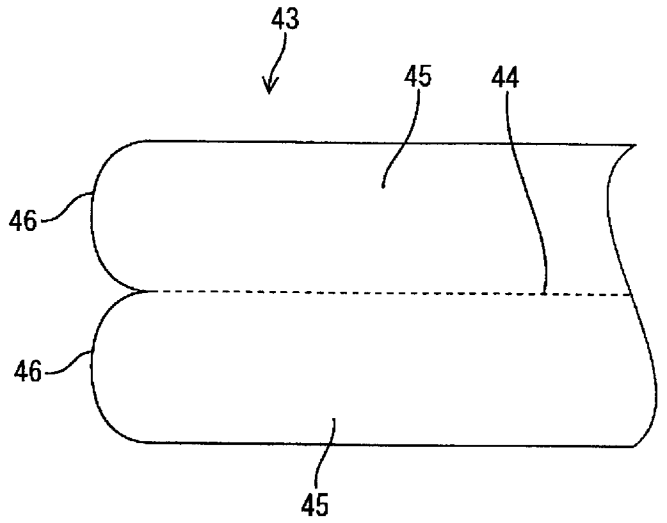
FIG. 7 is a plan view showing a development of the tab of FIG. 6.
Figure 8:
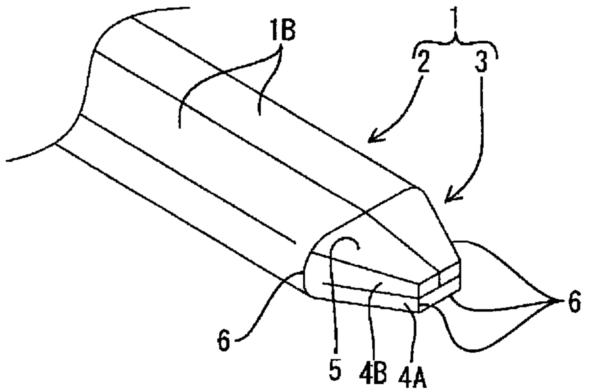
FIG. 8 PRIOR ART
FIG. 8 is a fragmentary enlarged perspective view of a prior art tab.
Figure 9:
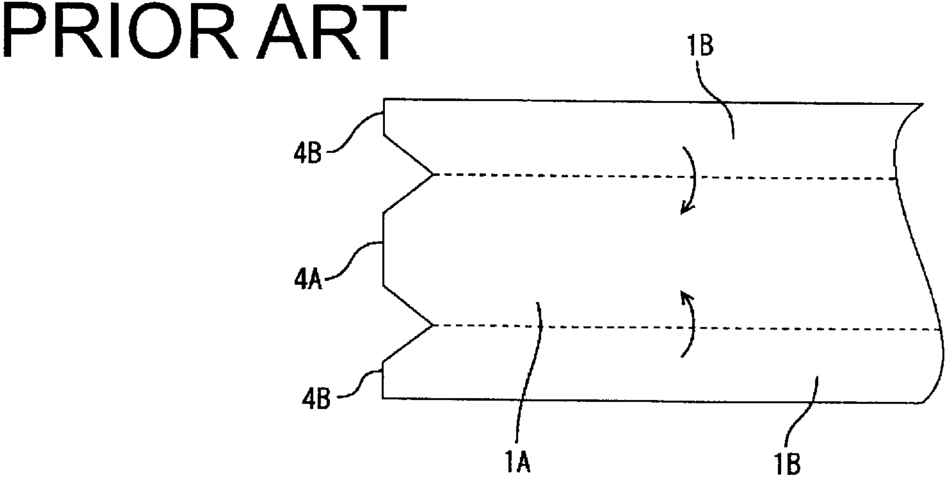
FIG. 9 PRIOR ART
FIG. 9 is a plan view showing a development of the prior art tab.

FIG. 6 shows an alternate tab 40 that includes a base 41 in the form of a flat plate and a tapered tip 42. The tab 40 is formed from a metallic plate 43 that is stamped by a press into a blank or development as shown in FIG. 7. This plate 43 has left and right sections 45 at the opposite sides of a fold line 44 located in the widthwise center. Arcuate cut surfaces 46, which are narrowed to their ends in plan view, are formed at the leading ends of the left and right sections 45. The left and right sections 45 are folded along the fold line 44 and are placed one over the other so that the cut surfaces 46 align to form the arcuate tip 42. Upper and lower slanted surfaces 47 are formed by pressing the tip 42 from above and below. Thereafter, in the same manner as the foregoing embodiment, a mold (not shown) is brought closer to the tab 40 from the front of the tab 40. Thus, the leading end of the tab 40 is inserted into the pressing recess in the mold and the tip 42 strikes the closed back wall to smash and round edges 48 on the tip 42. The invention is not limited to the above described and illustrated embodiment. For example, the following embodiment is also embraced by the technical scope of the present invention as defined by the claims. Beside the following embodiment, various changes can be made without departing from the scope and spirit of the present invention as defined by the claims.

What is claimed is:

1. A method for producing a tab of a male terminal fitting, the tab having a long narrow base with a leading end, a rear end and a longitudinal direction extending between the ends, a tapered tip at the leading end of the tab, the method comprising: providing a metallic plate; cutting the metallic plate to define at least first and second substantially flat sections, each said flat section having a rounded leading end;

folding at least one of the flat sections onto another of the flat sections such that the rounded leading ends substantially align for forming the tip; pressing the flat sections toward one another at the tip from directions substantially normal to the longitudinal direction for tapering the flat sections toward one another at the tip; providing a mold with a pressing recess having a back wall; and moving at least one of the mold and the tab substantially parallel to the longitudinal direction such that the tip of the tab enters into the pressing recess in the mold and strikes against the back wall of the pressing recess, whereby edges of the tip are smashed and rounded for eliminating sharp edges on the tip.

2. The method of claim 1, wherein the step of cutting the metallic plate comprises cutting the metallic plate such that the leading ends of the respective flat sections are substantially arcuate in plan view.

3. The method of claim 2, wherein the tip and at least part of the tab adjacent the tip are inserted closely into the pressing recess so that portions of the tab adjacent the tip are supported by the pressing recess and prevented from bending when the back wall strikes the tip.

4. The method according of claim 1, wherein the flat sections are formed to have slanted surfaces slanted in a thickness direction of the metallic plate.

5. The method of claim 1, wherein the step of cutting the metallic plate comprises cutting the metallic plate such that the first and second flat sections are unitary with one another along a fold line extending parallel to the longitudinal direction, the step of folding comprises folding the flat sections along the fold line.

6. The method of claim 5, wherein the step of cutting the metallic plate comprises cutting the metallic plate to define a third flat section unitary to the first flat section along a fold line parallel to the longitudinal direction, the step of folding comprising folding the second and third flat sections onto the first flat section.

* * * * *